ical Patent [19] [11] Patent Number: 4,957,137
Wang [45] Date of Patent: Sep. 18, 1990

[54] HOT/COOL WATER REGULATING FAUCET

[76] Inventor: Hong-Shang Wang, No. 70, Lane 139, Lien Cheng Road, Chungho, Taipei Hsien, Taiwan

[21] Appl. No.: 320,445

[22] Filed: Mar. 8, 1989

[51] Int. Cl.⁵ .............................................. F16K 11/16
[52] U.S. Cl. .................................. 137/549; 137/454.6; 137/607; 137/636.1
[58] Field of Search ...................... 137/607, 636.1, 549, 137/454.6

[56] References Cited

U.S. PATENT DOCUMENTS

| 976,908 | 11/1910 | Payne | 137/454.6 |
| 2,653,628 | 9/1953 | Spencer | 137/607 X |
| 2,934,091 | 4/1960 | Chapou | 137/636.1 X |
| 3,557,828 | 1/1971 | Smith | 137/636.1 X |
| 4,014,365 | 3/1977 | Peterson et al. | 137/549 |
| 4,649,950 | 3/1987 | Bradley | 137/549 |

FOREIGN PATENT DOCUMENTS 1194058 11/1959 France ............................... 137/454.6

Primary Examiner—Stephen M. Hepperle
Attorney, Agent, or Firm—Lowe, Price, LeBlanc, Becker & Shur

[57] ABSTRACT

A hot/cool water regulating faucet comprised of a housing and a cover knob, with two sleeves respectively mounted on the two cross shaped openings of the housing. Each sleeve is comprised of a movable axle connected with a spring, a rubber cock, a metal cap, a nut and a washer. By means of the tracks made on the cover knob to control the expansion of the two movable axles of the two sleeves, the flow rate of hot water and cool water and the mixed water temperature are concomitantly controlled.

6 Claims, 6 Drawing Sheets

HOT/COOL WATER REGULATING FAUCET

BACKGROUND OF THE INVENTION

This invention provides a hot/cool water regulating faucet and, more particularly to a water regulating faucet to simultaneously control hot and cool water supply by means of revolving process within a range of 180°.

Regular water faucet is separately arranged to control hot water or cool water. A desired water temperature is controlled by adjusting a hot water faucet and a cool water faucet respectively. This regulating procedure is more complicated and not convenient to properly adjust. There is another kind of water faucet structure for use to regulate hot water and cool water concomitantly. However, this design uses a single water outlet for hot water and cool water. Because the water pressure of hot water is lower than cool water, it is more difficult to control a suitable water temperature through single water outlet. It is very embarrassing to suffer from the abrupt changes of water temperature. The problem why the water temperature becomes excessively hot is that after having sustained the water pressure from the cool water pipe for a certain period of time, the vapor pressure in the hot water pipe is increased to force cool water backward such that the volume of cool water is drastically reduced; as soon as the vapor pressure is disappeared, the supplied water becomes cool. Further, this single water outlet control structure is easy to wear off to cause mechanical failure and water leakage. The present invention is to provide a more practical and durable hot/cool water regulating faucet to solve said problems.

SUMMARY OF THE INVENTION

The present invention is to provide a hot/cool water regulating faucet which includes two sleeves respectively mounted on the two cross shaped openings of the housing of the faucet. Each sleeve is comprised of a movable axle connected with a spring, a rubber cock, a metal cap, a nut and a washer. By means of the tracks made on the cover knob, the movement of the two movable axles of the two sleeves is simultaneously controlled to further let cool water come out from zero to the maximum flow rate, to let the cool water be changed to warm water and finally to let the warm water be changed to hot water. As soon as the faucet is turned to original position, all water supply is stopped.

DETAILED DESCRIPTION OF THE PREFERRED EMBODIMENTS

Figure 1:
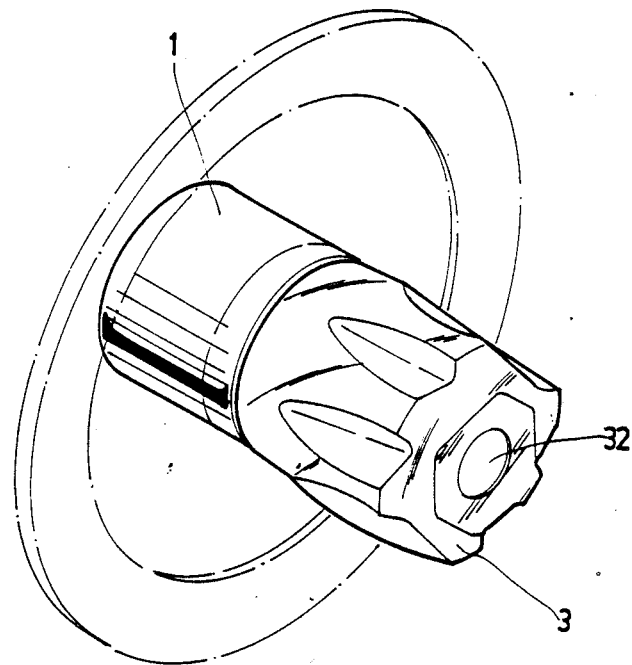
FIG. 1 is a perspective view of a hot/cool water regulating faucet embodying the present invention.
Figure 2:
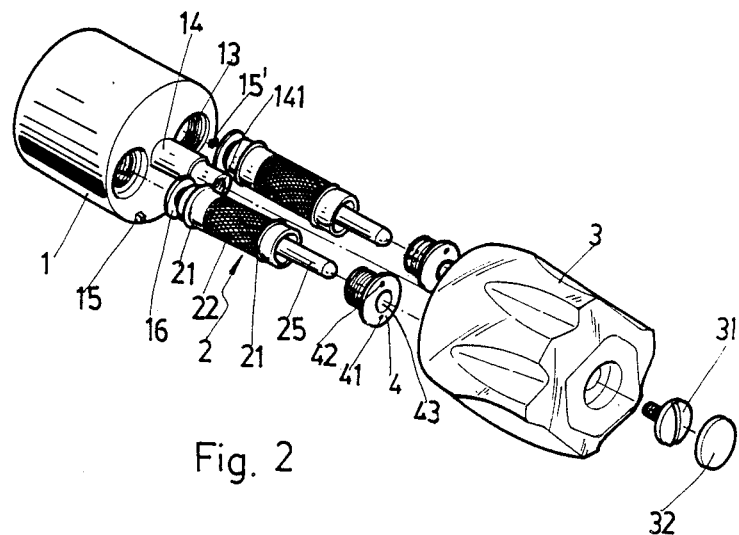
FIG. 2 is a fragmentary perspective view of the said preferred embodiment of the present invention.
Figure 3:
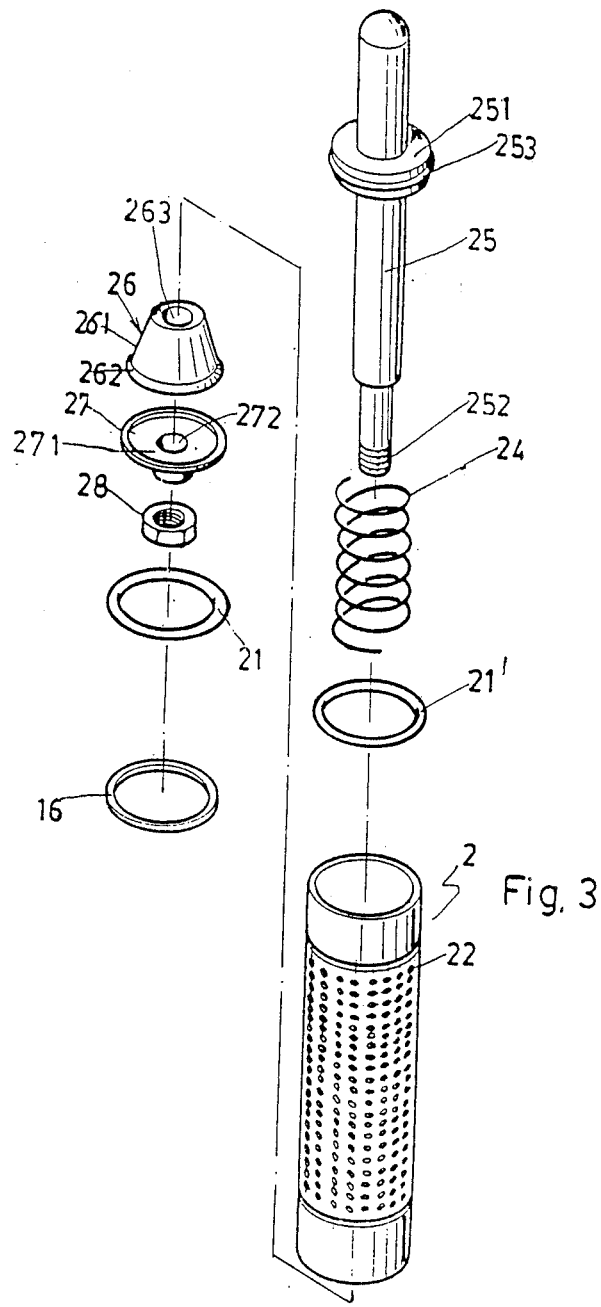
FIG. 3 is a partly fragmentary view of the sleeve.
Figure 4:
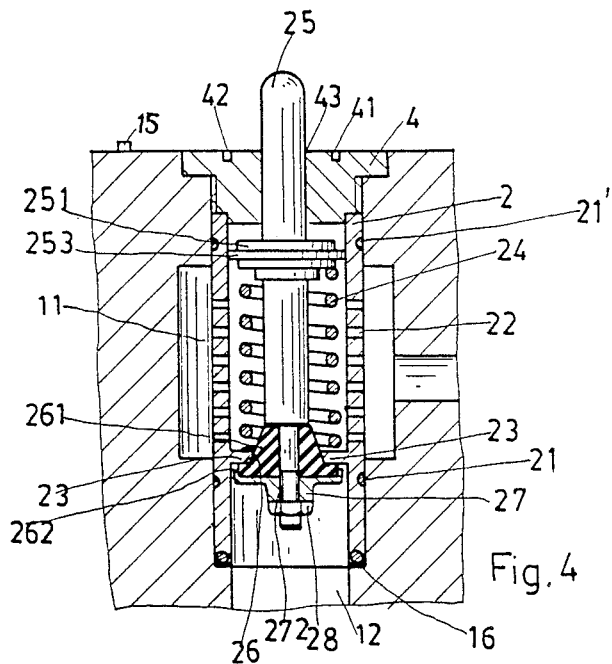
FIG. 4 is a partly sectional view of the said preferred embodiment of the present invention.
Figure 5:
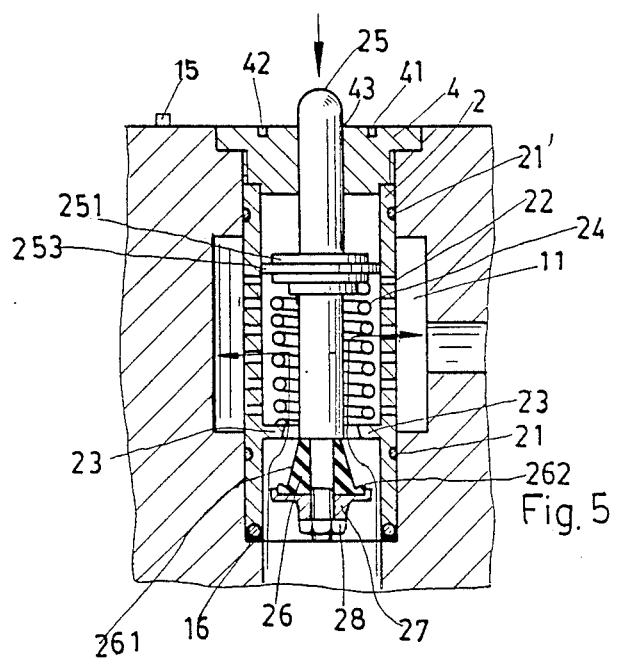
FIG. 5 is another partly sectional view of the said preferred embodiment of the present invention.
Figure 6:
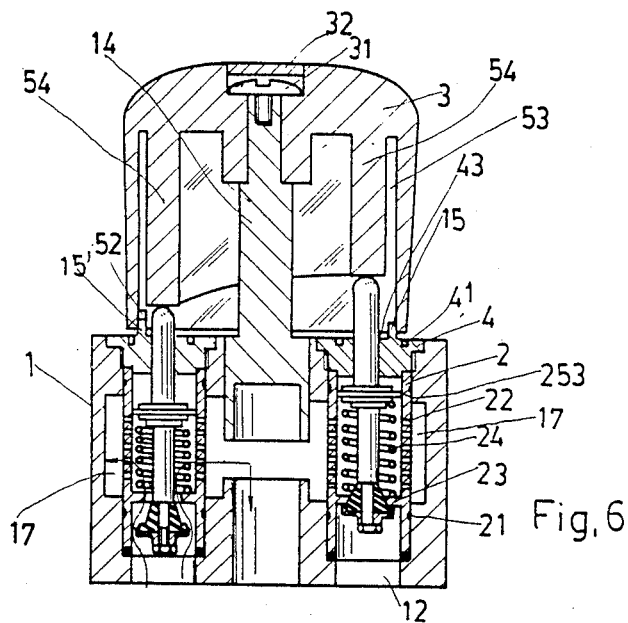
FIG. 6 is a sectional view of the said preferred embodiment of the present invention.

Referring to FIGS. 1 through 6, the housing (1) includes thereinside two cross shaped openings (11). The cross shaped openings (11) each comprises a water inlet (12) at the bottom, and an inner thread (13) at the top for connection with an upper cap (4) by means of screw joint. The size of either one the two cross shaped openings (11) is arranged for setting therein of a respective sleeve (2) with a washer (21) mounted thereon to tightly block up the associated opening (11) so as to further prevent from water leakage from the sleeve (2). The sleeve (2) comprises a plurality of holes (22) for passing therethrough of water from or to a water outlet tube (17), wherein the holes (22) may be replaced by a wire mesh to let water pass therethrough and to simultaneously filtrate the water. The housing (1) also comprises two stop blocks (15) and (15') at the top to control the revolving of the water regulating mechanism within a range of 180°. The sleeve (2) comprises thereinside an inner flange (23). After a spring (24) is set in the sleeve (2) on its inner flange (23), a movable axle (25) is further inserted therein and pressed downward to penetrate through the spring (24), the inner flange (23) the central hole (263) of a rubber cock (26), the central hole (272) of a metal cap (27), and further be screwed up with a nut (28) at the bottom end, such that the rubber cock (26) and the metal cover (27) are disposed at the bottom of the inner flange (23), and the spring (24) is disposed at the top of the inner flange (23). Because the spring (24) is connected to the circular flange with one end and connected to the outer flange (251) of the movable axle (25) with the other end, when no pressing forced is applied on the movable axle (25), the spring force from the spring (24) and the water pressure at water inlet will force the rubber cock (26) to block up the bottom end of the inner flange (23) of the sleeve (2). Because the rubber cock (26) has a conical configuration, when it is forced to move upward by the spring force and water pressure, its right circular cone (261) will be pushed upward to insert into the hole defined by the inner flange (23), and its bottom flange (262) will match with the upper flange (271) of the metal cap (27) to block up the passage, so as to stop water permeation therethrough. By means of this arrangement, the faucet is tightly sealed to prevent from water leakage when it is turned off. The movable axle (25) comprises an outer thread (252) for fixation thereto of the nut (28) after it is inserted through the central hole (263) of the rubber cock (26) and the central hole (272) of the metal cap (27). During assembly, a rubber ring (253) is provided to mount on the movable axle (25) below the outer flange (251) so as to provide water tight effect and to prevent from water leakage from the upper cap (4).

Referring to FIGS. 2 through 6 again, the cover knob (3) is fixedly mounted on the main shaft (14) to let the screw hole (141) of the main shaft (14) be set in the axial hole (55) of the holder plate (5) of the cover knob (3) so as to further let a screw (31) screw up the cover knob (3) with the housing (1) and to let a cap cover the screw to complete the assembly.

Figures 9, 10:
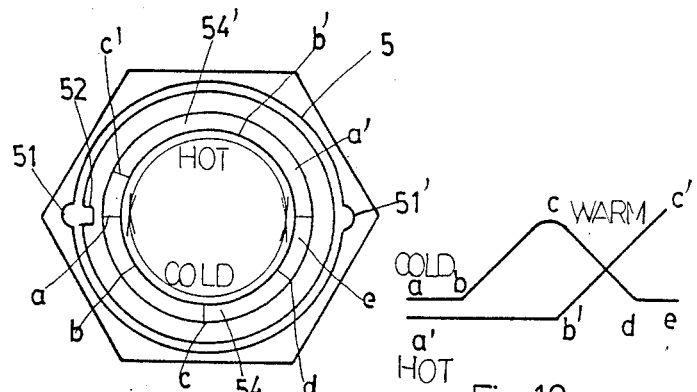
FIG. 9 is a bottom view of the cover knob.
FIG. 10 illustrates the hot/cool water regulation curve.
Figure 7:
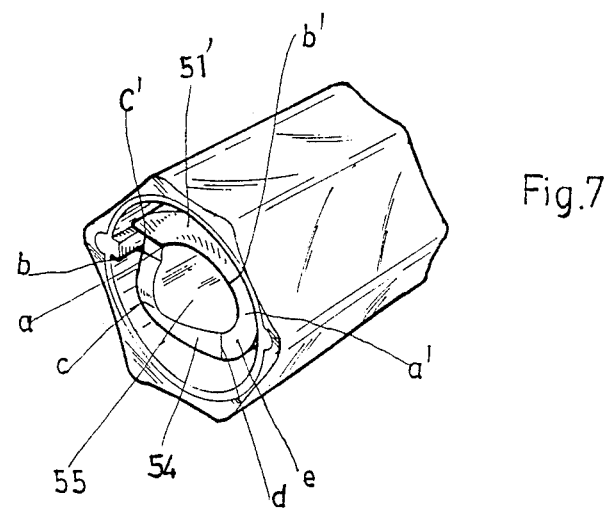
FIG. 7 is a perspective view of the cover knob.
Figure 8:
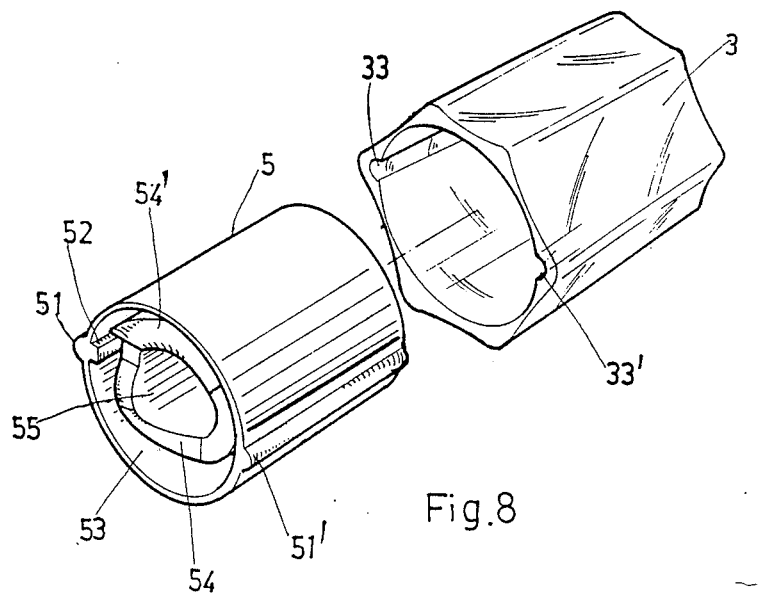
FIG. 8 is a fragmentary perspective view of the cover knob.

Referring to FIGS. 7 through 10 again, the cover knob (3) is connected with the holder plate (5) by means of sleeve joint, comprising two opposite grooves (33) and (33') for setting therein of the two raised strips (51)

and (51') of the holder plate (5) respectively, such that the cover knob (3) and the holder plate (5) are tightly connected to form into one unit. The holder plate (5) comprises a retainer means (52) to match with the two stop blocks (15) and (15') of the housing (1) so as to control the angle of rotation of the cover knob (3), a slot (53) thereinside to define two tracks (54) and (54') wherein the first track (54) is to control the up-and-down movement of the movable axle for cool water (25) so as to further control the flow rate of cool water; the second track (54') is to control the up-and-down movement of the movable axle for hot water (25) so as to further control the flow rate of hot water. The curve of the track (54) is as shown in FIGS. 8, 9 and 10. The front section of the curve a-b is a flat portion to prevent the track from pressing on the movable axle (25), such that the movable axle (25) is forced by the tensile force of the spring (24) and the water pressure to block up the water outlet. The curve is rising up from b-c to allow the track force the movable axle (25) to turn on the faucet to discharge water. The section b-c is to control cool water flow rate. The section c-d is a falling curve. The section d-e is to turn off water supply. In the curve of the second track (54') for hot water, a'-b' is to block up hot water flow, b'-c' is a rising curve to let hot water flow rate be gradually increased. When in operation, it is to firstly control cool water flow rate, that is to turn to the section of b-c. When cool water flow rate reaches to its maximum capacity, that is to turn to the section of c-d, the hot water is simultaneously turned on. The section of c-d is to mix hot and cool water, that is to regulate water temperature. As soon as turning to the section of d-e, the cool water is stopped and the hot water flow rate reaches to its maximum capacity.

Because of the arrangement of the two tracks (54) (54') on the inner loop (360°) of the holder plate (5) with the first track (54) defined for cool water and with the second track (54') defined for hot water, the hot water area and the cool water area are associated with each other. In the hot water area, a'-b' is a flat portion such that the revolving of the cover knob (3) will gradually increase the cool water flow rate from zero to maximum. As soon as cool water reaches to its maximum capacity (C point), that is the section c-d, the cool water flow rate is gradually reducing and, the hot water flow rate is gradually increasing concomitantly, in other words, this section is for water temperature regulation. Therefore, by means of position adjusting within the section of c-d, the water temperature is regulated accordingly. As soon as the section of c-d is reached, hot water flow rate reaches to its maximum capacity and, cool water is stopped at the same time, therefore, hot water is discharged. If to turn off the faucet, it is to turn backward to the original section of a-b.

When in operation, cool water flows out immediately after the faucet is turned on. When keeps turning on, the cool water will reach to its maximum flow rate and, the hot water comes out thereafter to mix with the cool water to a preferred water temperature. When the faucet is turned on to the upper limit, the stop block (15) of the housing (1) is retained to block up cool water, and therefore only hot water comes out. When to turn off the faucet, it is to turn back the cover knob to the original a-b position to let the other stop block (15') of the housing (1) be retained so as to block up the passage for water outlet.

As above described, the embodiment of the present invention has various features as hereunder.

1. The point of convergence of the hot water and the cool water is not at the same opening, and therefore, sudden change of water temperature is avoided.

2. Because hot water and cool water are controlled by means of the movement of two movable axles respectively driven by two tracks on the inner loop of the cover knob, the flow rate of the hot and cool water and the mixed water temperature are easy to control.

3. Double water leakage protection to ensure maximum security.

4. Conical rubber cock minimizes the chance of mechanical breakdown.

5. Replacement of conical rubber is simply made by drawing out the associated sleeve from the housing without removing the housing.

6. Each sleeve comprises a wire filter structure and, therefore no additional filter means is required.

I claim:

1. A hot/cool water regulating faucet, comprising:
   a housing, having two cross shaped openings, said cross shaped openings each comprising an inner thread at the top and being respectively in communication with an associated water inlet and water outlet, said housing also comprising a main shaft at the center, said main shaft having a thread hole;
   two sleeves being set in said two cross shaped openings respectively, said two sleeves each comprising a plurality of holes at the middle portion and having a movable axle thereinside for mounting thereon of a spring to further be connected with a rubber cock and a metal cap and screwed up with a nut;
   two stepped upper caps to match with said two sleeves, said two stepped upper caps each having an outer thread and a central hole to allow the associated movable axle to be inserted into said central hole so as to confine the associated sleeve in the associated cross shaped opening of said housing;
   a cover knob, comprising two grooves, a retainer means, and two tracks, said two tracks being to control said two movable axles of said two sleeves respectively;
   said two sleeves are respectively set in said two cross shaped openings of said housing and said cover knob is fixedly mounted on said main shaft such that the revolving of said cover knob drives said two tracks to push said two movable axles of said two sleeves to move so as to simultaneously control the water flow rate of hot water and cool water.

2. A hot/cool water regulating faucet according to claim 1, wherein said housing comprises two stop blocks at the top to define a revolving range of said cover knob within an angle of 180°.

3. A hot/cool water regulating faucet according to claim 1, wherein said cover knob comprises a first track and a second track on its inner loop within an angle of 360°; said first track being to control cool water flow rate, having a flat a-b section to block up all water supply, a raising b-c section to control cool water flow rate, a falling c-d section to control hot and cool water mixing ratio and to stop cool water; said second track being to control hot water flow rate, having a flat a'-b' section to stop hot water supply, a raising b'-c' section to control hot and cool water mixing ratio and to consequently turn the mixed water into maximum flow rate of hot water.

4. A hot/cool water regulating faucet according to claim 1, wherein said sleeve comprises a rubber cock, said rubber cock having a right circular cone to insert into the hole defined by the inner flange of said sleeve to form a first blocking mechanism, said rubber cock also having a bottom flange to match with the upper flange of said metal cap to form a second blocking mechanism; said two blocking mechanisms being tightly sealed to prevent from water leakage when the faucet is turned off and said two blocking mechanisms being turned on to let water flow pass therethrough when the faucet is turned on.

5. A hot/cool water regulating faucet according to claim 1, wherein said movable axle comprises an outer flange made at a proper position, a spring being mounted on said movable axle with one end connected to said outer flange and with the other end connected to the inner flange of said sleeve; said spring being to provide a tensile force to match with the water pressure at water inlet so as to control said movable axle to automatically block up water outlet when no outer force is applied on said movable axle.

6. A hot/cool water regulating faucet according to claim 1, wherein said sleeve is independently disposed for easy replacement, comprising a plurality of holes to provide water filtration effect.

* * * * *